(12) United States Patent
Owen

(10) Patent No.: US 9,845,069 B1
(45) Date of Patent: Dec. 19, 2017

(54) AIRBAG INCLUDING COMPRESSIBLE VENT TUBE

(71) Applicant: Ford Global Technologies, LLC, Dearborn, MI (US)

(72) Inventor: Elizabeth G. Owen, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/253,960

(22) Filed: Sep. 1, 2016

(51) Int. Cl.
*B60R 21/239* (2006.01)
*B60R 21/203* (2006.01)
*B60R 21/205* (2011.01)

(52) U.S. Cl.
CPC .......... *B60R 21/239* (2013.01); *B60R 21/203* (2013.01); *B60R 21/205* (2013.01)

(58) Field of Classification Search
CPC .... B60R 21/239; B60R 21/203; B60R 21/205
See application file for complete search history.

(56) References Cited

U.S. PATENT DOCUMENTS

| | | | | |
|---|---|---|---|---|
| 6,126,196 A * | 10/2000 | Zimmerman | ......... | B60R 21/239 280/739 |
| 6,260,877 B1 * | 7/2001 | Rasmussen, Sr. | .... | B60R 21/203 280/729 |
| 6,419,267 B1 * | 7/2002 | Hashimoto | ........... | B60R 21/233 280/729 |
| 6,554,313 B2 * | 4/2003 | Uchida | ................. | B60R 21/233 280/729 |
| 7,261,319 B2 | 8/2007 | DePottey et al. | | |
| 7,850,200 B2 | 12/2010 | Zauritz et al. | | |
| 7,988,188 B2 * | 8/2011 | Zauritz | ................. | B60R 21/207 280/730.2 |
| 9,016,721 B1 * | 4/2015 | Potter | ................... | B60R 21/239 280/739 |
| 2009/0289444 A1 | 11/2009 | Keshavaraj | | |
| 2013/0147169 A1 | 6/2013 | Boyle, III | | |
| 2014/0125039 A1 * | 5/2014 | Abele | ................... | B60R 21/239 280/730.1 |
| 2014/0265274 A1 | 9/2014 | Piccard | | |

FOREIGN PATENT DOCUMENTS

FR 2993223 A1 7/2012
WO WO 2016077707 A1 5/2016

* cited by examiner

*Primary Examiner* — Faye M Fleming
(74) *Attorney, Agent, or Firm* — Frank A. MacKenzie; Bejin Bieneman PLC

(57) ABSTRACT

A restraint system in a vehicle includes a reaction surface, an airbag including an inflation chamber, and a tube in fluid communication with the inflation chamber. The airbag is inflatable from an undeployed state to a deployed state. The airbag is fixed relative to the reaction surface in the undeployed state and adjacent the reaction surface in the deployed state. The tube extends along the airbag between the airbag in the deployed state and the reaction surface.

20 Claims, 8 Drawing Sheets

AIRBAG INCLUDING COMPRESSIBLE VENT TUBE

BACKGROUND

Motor vehicles, such as automobiles, may include airbags designed to inflate and be impacted by occupants during an impact of the vehicle with a stationary or moving object. For example, airbags may deploy from a steering wheel toward a driver and from an instrument panel toward a passenger. The driver may impact the airbag from the steering wheel, and the passenger may impact the airbag from the instrument panel. The airbags may include vents that actively or passively regulate an internal pressure of the airbag.

DETAILED DESCRIPTION

Figure 1:
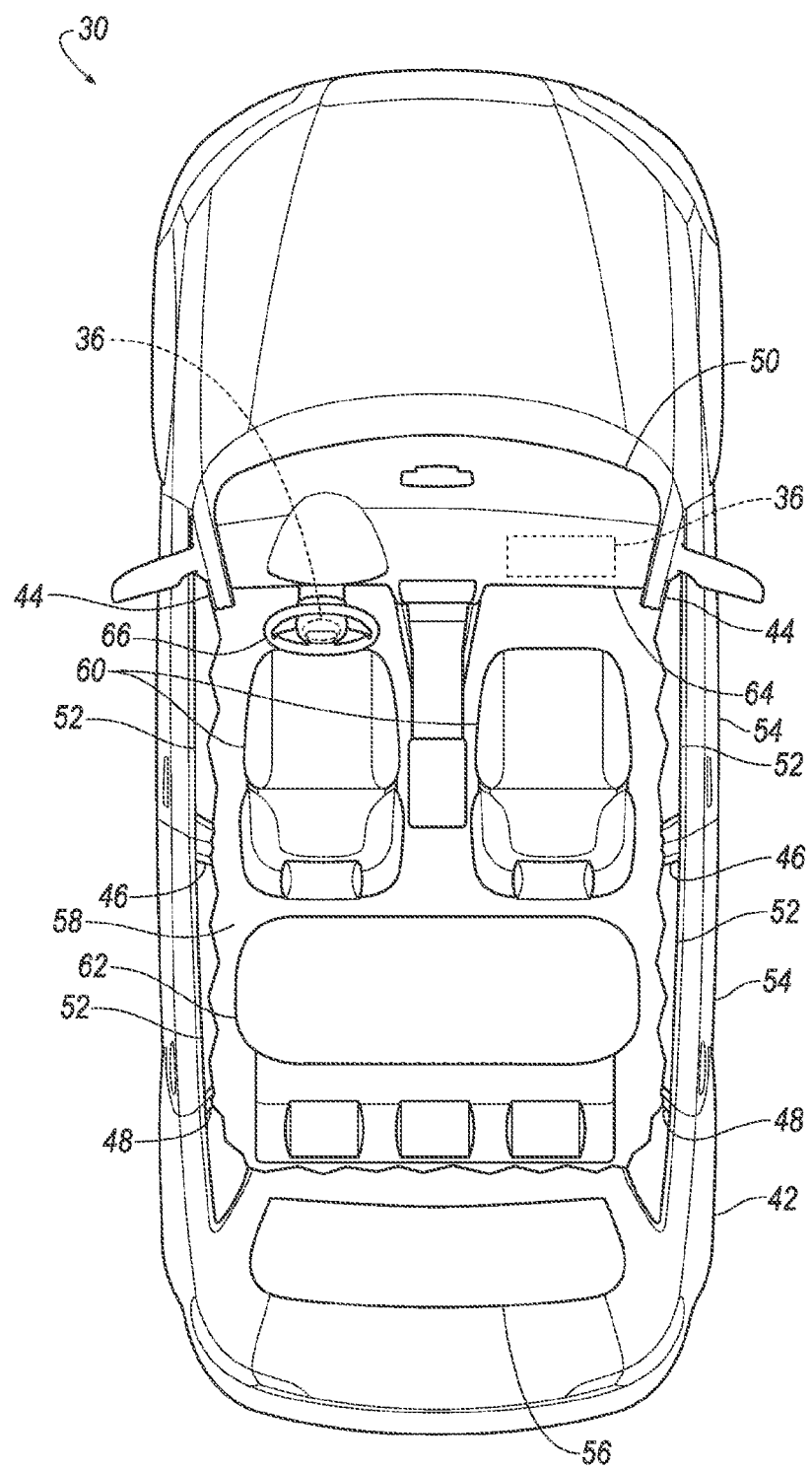
FIG. 1 is a top view of a vehicle with a passenger cabin exposed.

With reference to the Figures, wherein like numerals indicate like parts throughout the several views, a restraint system 32 of a vehicle 30 includes a reaction surface 44, 64, 66, an airbag 36 including an inflation chamber 38, and a tube 40 in fluid communication with the inflation chamber 38. The airbag 36 is inflatable from an undeployed state, as shown in FIG. 1, to a deployed state, as shown in FIGS. 3-10. The airbag 36 in the undeployed state is fixed relative to the reaction surface 44, 64, 66, and the airbag 36 in the deployed state is adjacent the reaction surface 44, 64, 66. The tube 40 extends along the airbag 36 between the airbag 36 in the deployed state and the reaction surface 44, 64, 66. One example embodiment of the restraint system is shown in FIGS. 3-5B, in which the airbag 36 is a passenger airbag, as set forth further below. Another example embodiment of the restraint system is shown in FIGS. 6-8B, in which the airbag is a driver airbag, as set forth further below. Common numerals are used to identify common features in FIGS. 3-8B.

The characteristics of the airbag 36 may vary depending on whether the tube 40 is compressed against the reaction surface 44, 64, 66 when an occupant impacts the airbag 36, thus providing performance customized to a direction of an impact to the vehicle 30. For example, the airbag 36 and the tube 40 may be positioned such that the tube 40 is compressed by the reaction surface 44, 64, 66 if momentum of the occupant is in a vehicle-forward direction but not if the momentum of the occupant is at an angle relative to the vehicle-forward direction. Thus, the airbag 36 may be stiffer in the former and softer in the latter. "Stiffer" refers to a higher internal pressure of the airbag 36, and "softer" refers to a lower internal pressure of the airbag 36. A stiffer airbag 36 may provide better performance for the occupant in a frontal impact because there is a shorter distance between the occupant and a rigid component of the vehicle 30 than in an oblique impact. A softer airbag 36 may provide better performance for the occupant in an oblique impact because the occupant is less likely to slide off the airbag 36 toward a rigid component of the vehicle 30 than with a stiffer airbag 36. Furthermore, control of the internal pressure of the airbag 36 is achieved passively, that is, without additional sensing or algorithms.

With reference to FIG. 1, the vehicle 30 includes a body 42. The body 42 may be of a unibody construction in which at least some of the body 42 is exposed and may present a class-A surface (not numbered), i.e., a surface specifically manufactured to have a high-quality, finished aesthetic appearance free of blemishes. The body 42 may, alternatively, be of a body-on-frame construction, or of any other suitable construction. The body 42 may be formed of any suitable material, for example, steel, aluminum, etc.

The body 42 of the vehicle 30 may include A pillars 44, B pillars 46, and C pillars 48. The A pillars 44 may extend between a windshield 50 and windows 52. The B pillars 46 may extend between the windows 52 of adjacent doors 54. The C pillars 48 may extend between the windows 52 and a backlite 56. The body 42 may also include D pillars (not shown) if the vehicle 30 is, e.g., an SUV, crossover, minivan, or station wagon, in which case the C pillars 48 extend between the windows 52 of rear doors 54 and rear left and right windows, and the D pillars extend between the rear right and left windows and the backlite 56.

The vehicle 30 includes a passenger cabin 58 to house occupants, if any, of the vehicle 30. The passenger cabin 58 includes one or more front seats 60 disposed at a front of the passenger cabin 58 and one or more back seats 62 disposed behind the front seats 60. The passenger cabin 58 may also include third-row seats (not shown) at a rear of the passenger cabin 58. In FIG. 1, the front seats 60 are shown to be bucket seats, but the seats 60, 62 may be other types. The position and orientation of the seats and components thereof may be adjustable by an occupant.

An instrument panel 64 may be disposed at a forward end of the passenger cabin 58 and face toward the front seats 60. Vehicle controls, including a steering wheel 66, may be supported on the instrument panel 64. The instrument panel 64 may be fixed relative to the body 42, or more specifically, may be fixed relative to the A pillar 44.

The reaction surface 44, 64, 66 is a rigid surface against which the airbag 36 pushes when the airbag 36 is in the deployed state and an occupant is impacting the airbag 36. Depending on the structure and location of the airbag 36, the reaction surface may be the windshield 50, the instrument panel 64, the steering wheel 66, the A pillar 44, and/or another rigid surface of the vehicle 30.

Figure 2:
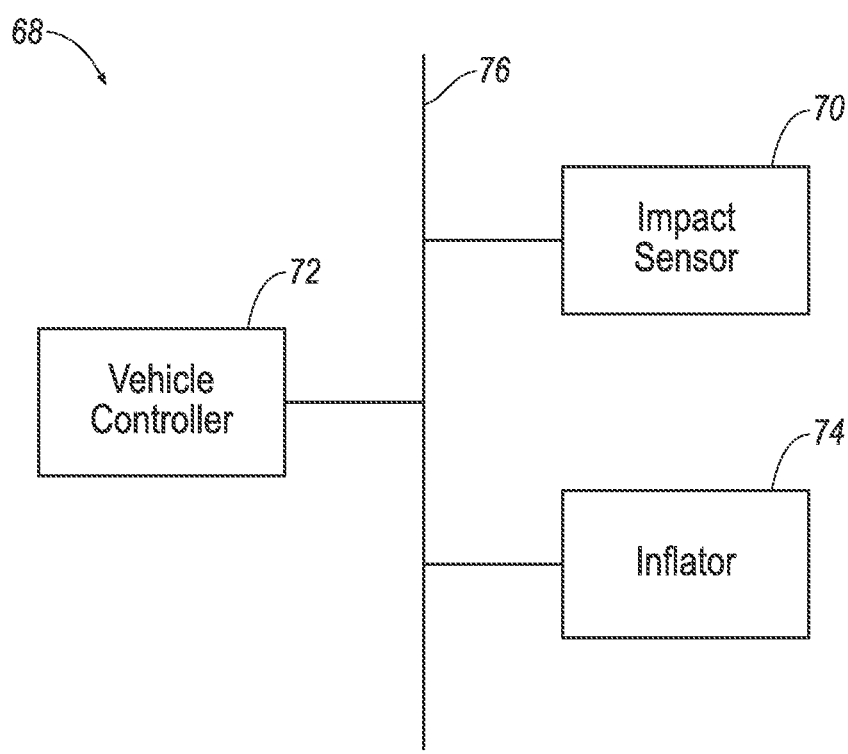
FIG. 2 is a block diagram of a control system of the vehicle.

With reference to FIG. 2, a control system 68 may include an impact sensor 70, a controller 72, and an inflator 74, all in communication through a communications network 76. The control system 68 may transmit signals through the communications network 76 such as a controller area network (CAN) bus, Ethernet, Local Interconnect Network (LIN), and/or by any other wired or wireless communications network.

The impact sensor 70 may be in communication with the controller 72. The impact sensor 70 is adapted to detect an impact to the vehicle 30. The impact sensor 70 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 70 may be located at numerous points in or on the vehicle 30.

The controller 72 may be a microprocessor-based controller. The controller 72 may include a processor, memory, etc. The memory of the controller 72 may include memory for storing instructions executable by the processor as well as for electronically storing data and/or databases.

The inflator 74 may be connected to the airbag 36 and in communication with the controller 72. Upon receiving a signal from, e.g., the controller 72, the inflator 74 may inflate the airbag 36 with an inflatable medium, such as a gas. The inflator 74 may be, for example, a pyrotechnic inflator that uses a chemical reaction to drive inflation medium to the airbag 36. The chemical reaction may be initiated by, e.g., a squib or detonator (not shown). The inflator 74 may be of any suitable type, for example, a cold-gas inflator.

Figure 3:
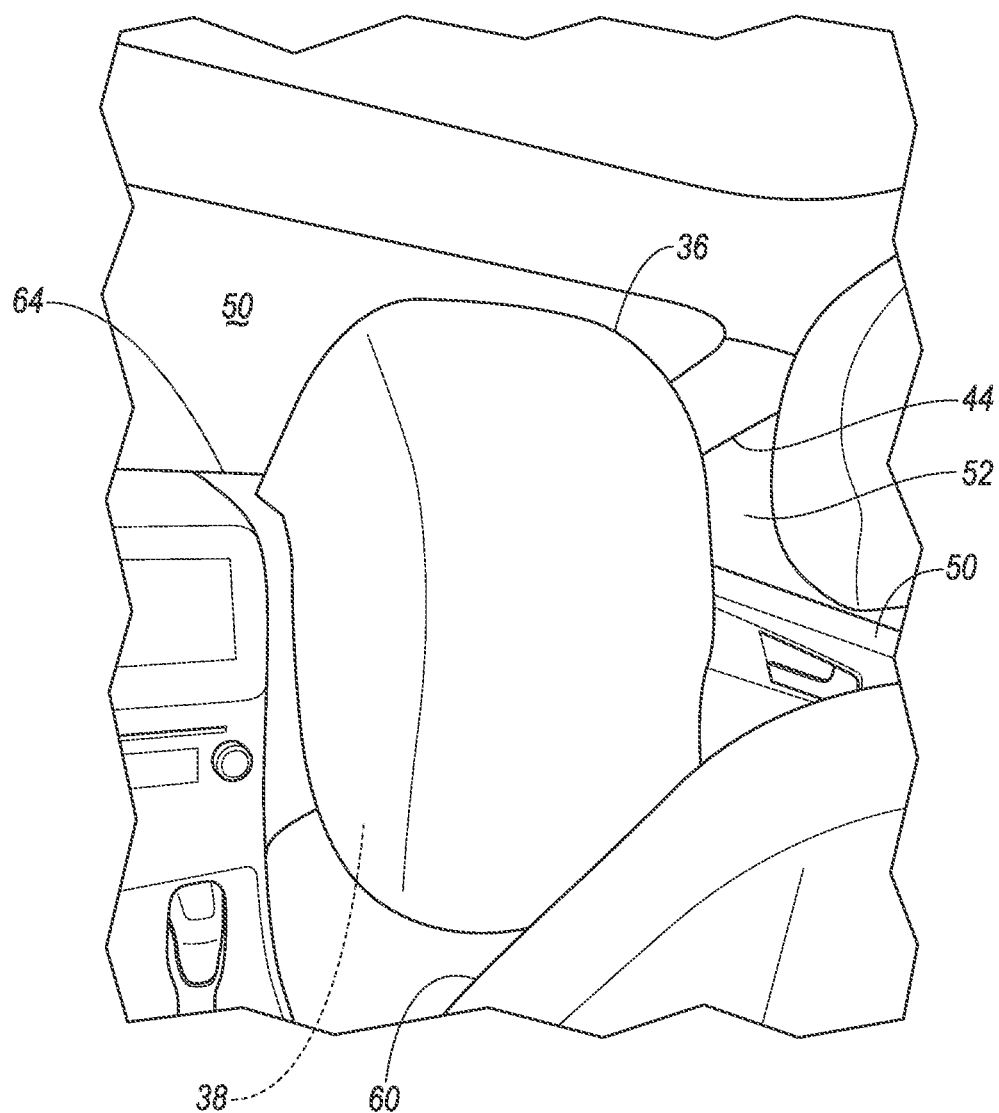
FIG. 3 is a perspective view of a first embodiment of a restraint system in the passenger cabin.
Figure 4:
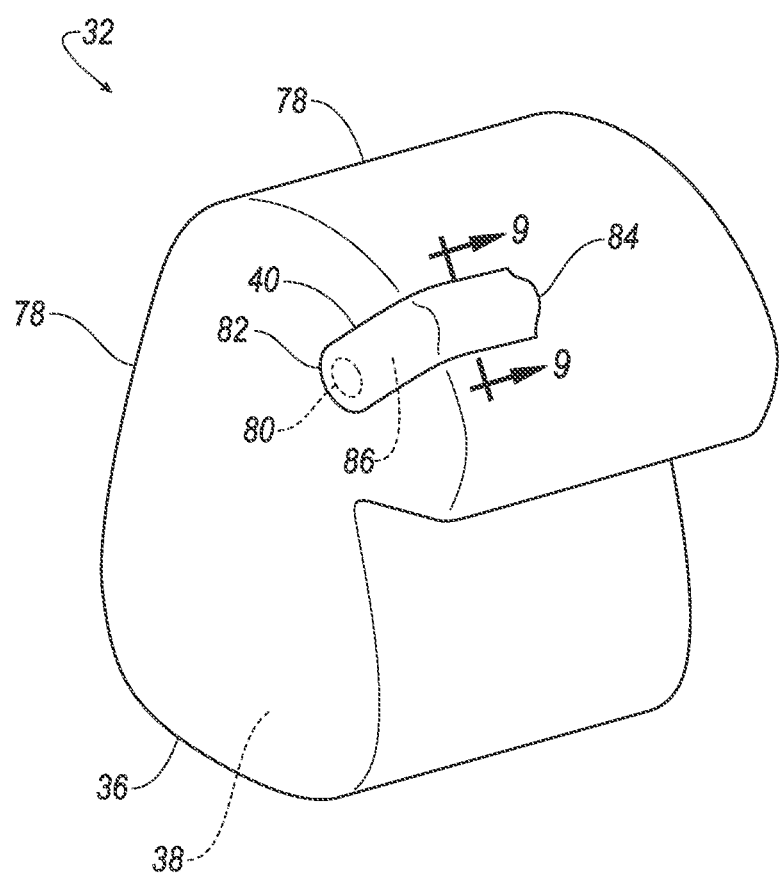
FIG. 4 is a perspective view of an airbag of the first embodiment of the restraint system.
Figure 6:
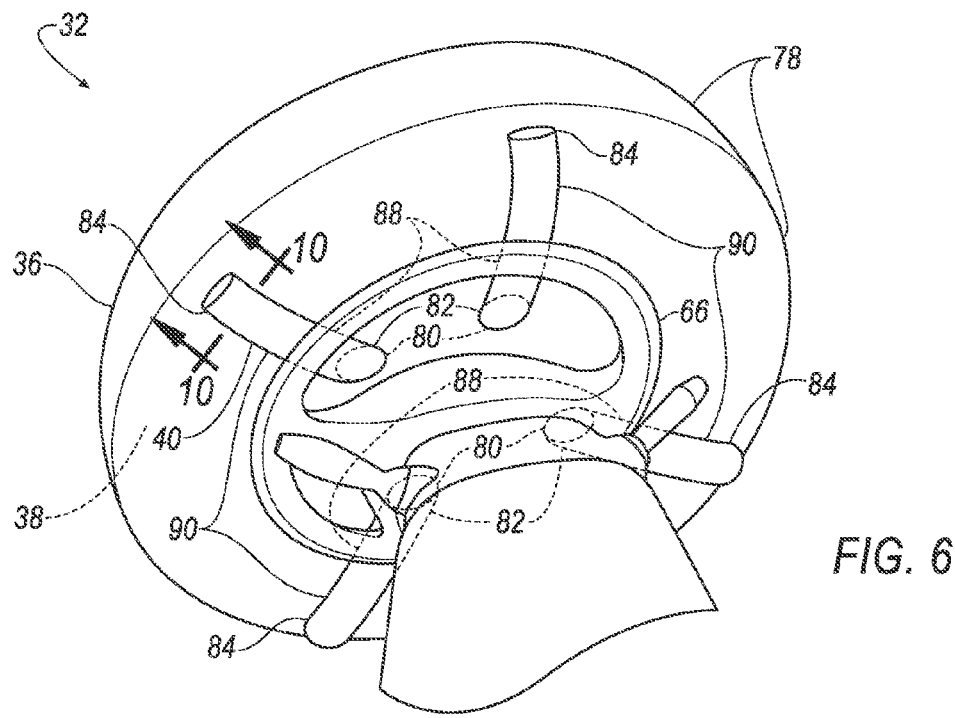
FIG. 6 is a perspective view of a second embodiment of the restraint system in the passenger cabin.

With reference to FIGS. 3, 4, and 6, the airbag 36 includes the inflation chamber 38 and is inflatable from the undeployed state to the deployed state. The airbag 36 includes one or more panels 78 stitched or attached together. The airbag may include one or multiple inflation chambers 38. The airbag 36 in the undeployed state may be disposed in a module (not shown) and in communication with the inflator 74. The airbag 36 includes a vent 80. The vent 80 may be, for example, an open vent, a one-way vent, a two-way vent, or an active vent. In addition to the vent 80, the airbag 36 may include any suitable number of vents (not shown), e.g., open vents, one-way vents, two-way vents, or active vents, that communicate from the inflation chamber 38 to the atmosphere exterior to the airbag 36.

The airbag 36 may be formed of any suitable airbag material, for example, a woven polymer. For example, the airbag 36 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

Figure 5A:
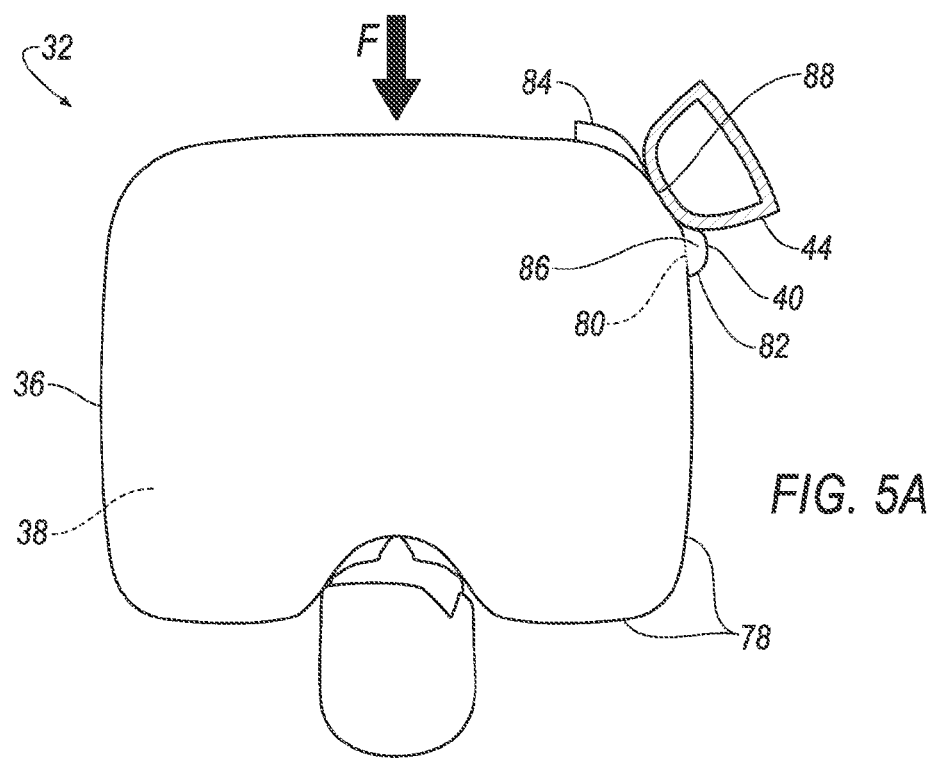
FIG. 5A is a top view of the first embodiment of the restraint system after a forward impact by a dummy head with a tube on the airbag compressed between an A pillar of the vehicle and the airbag.
Figure 5B:
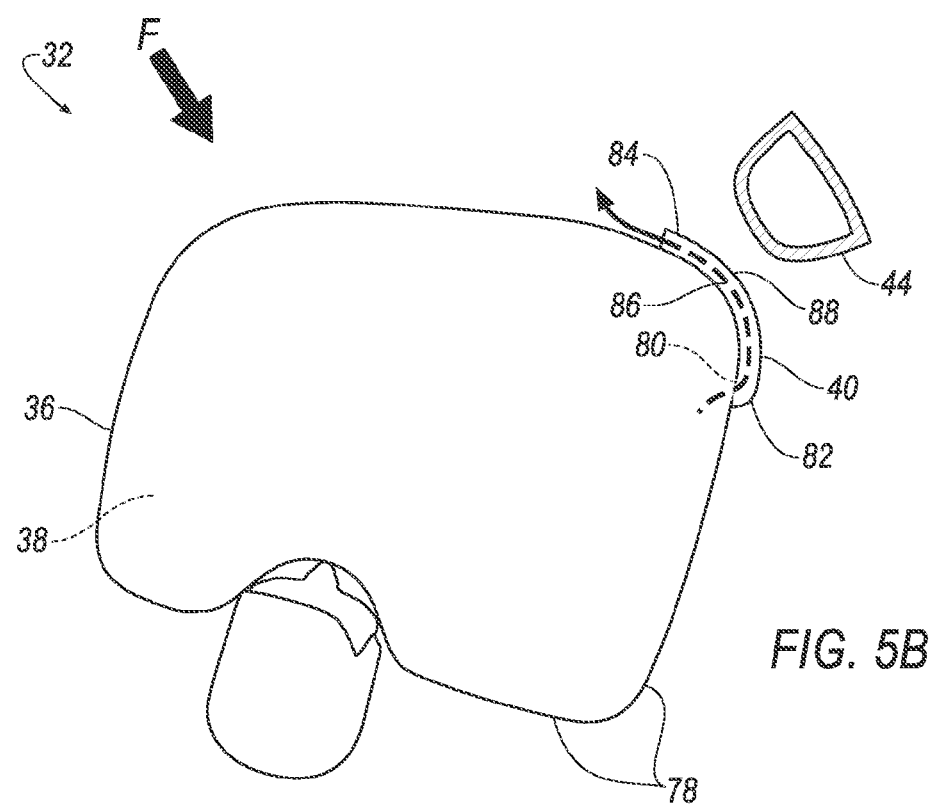
FIG. 5B is a top view of the first embodiment of the restraint system after an oblique forward impact by a dummy head with the tube spaced from the A pillar.
Figure 8A:
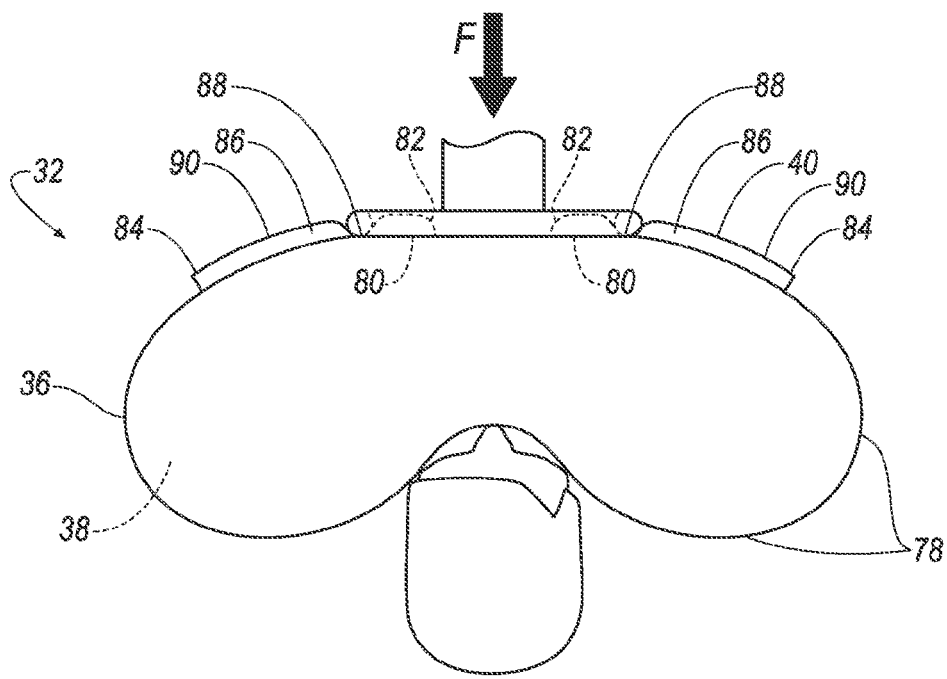
FIG. 8A is a top view of the second embodiment of the restraint system after a forward impact by a dummy head with tubes on the airbag compressed between the airbag and the steering wheel.
Figure 8B:
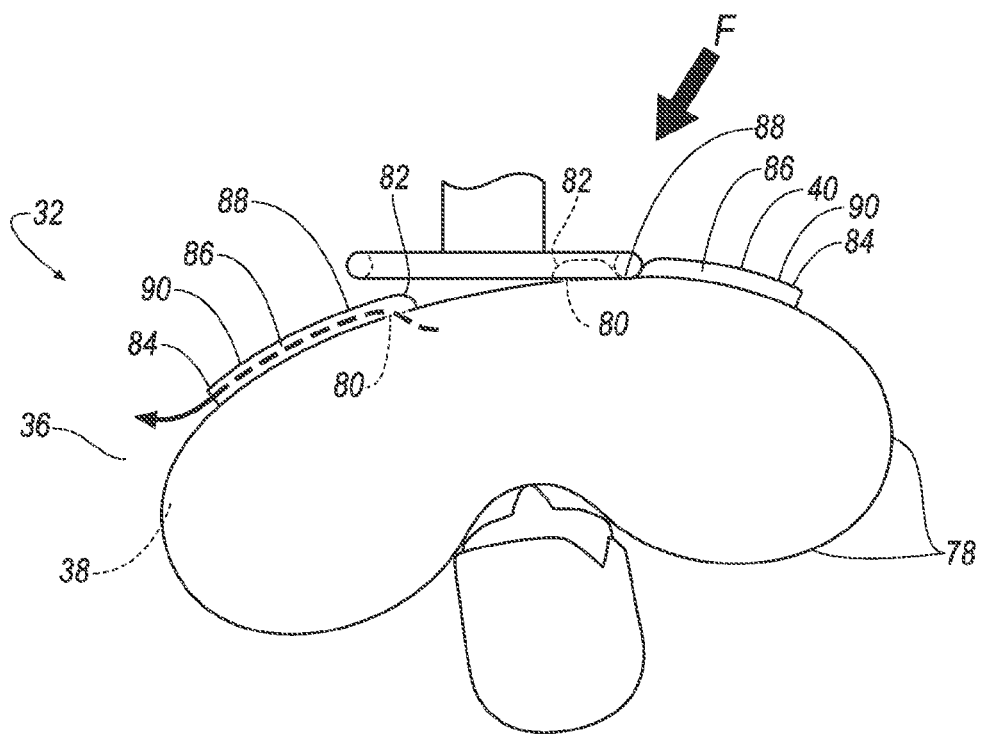
FIG. 8B is a top view of the second embodiment of the restraint system after an oblique forward impact by a dummy head with one of the tubes spaced from the steering wheel.

The airbag 36 is fixed relative to the reaction surface 44, 64, 66 in the undeployed state, as shown in FIG. 1, and adjacent the reaction surface 44, 64, 66 in the deployed state, as shown in FIGS. 3 and 6. "Adjacent" means the lack of anything therebetween. In the embodiment in which the A pillar 44 serves as the reaction surface, then the airbag 36 in the undeployed state may be disposed in the instrument panel 64, as shown in FIG. 1, and the airbag 36 in the deployed position may be adjacent the A pillar 44, as shown in FIGS. 3 and 5A-B. In the embodiment in which the steering wheel 66 serves as the reaction surface, then the airbag 36 in the undeployed state may be disposed in the steering wheel 66, as shown in FIG. 1, and the airbag 36 in the deployed state may be adjacent the steering wheel 66, specifically a circular rim of the steering wheel 66, as shown in FIGS. 6 and 8A-B.

The tube 40 includes a first end 82 and a second end 84 spaced from each other and fixed to one of the panels 78. (The adjectives "first" and "second" are used throughout this document as identifiers and are not intended to signify importance or order.) The tube 40 extends from the first end 82 to the second end 84. The first end 82 may be in fluid communication with the inflation chamber 38, e.g., through the vent 80, and the second end 84 may be open external to the inflation chamber 38. The second end 84 may be in fluid communication with, for example, the passenger cabin 58. The vent 80 may be disposed at the first end 82 of the tube 40.

Figure 9:
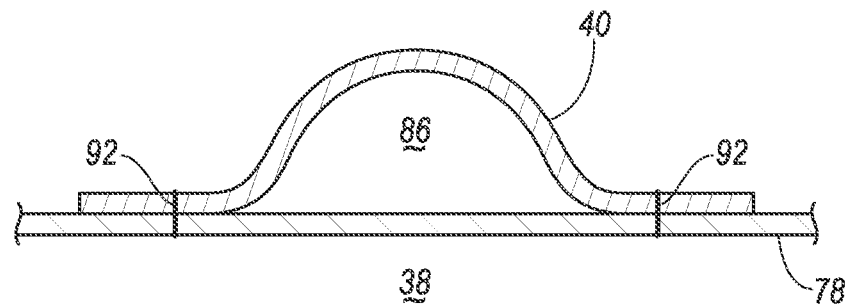
FIG. 9 is a cross-section of a portion of the airbag along line 9 of FIG. 4.
Figure 10:
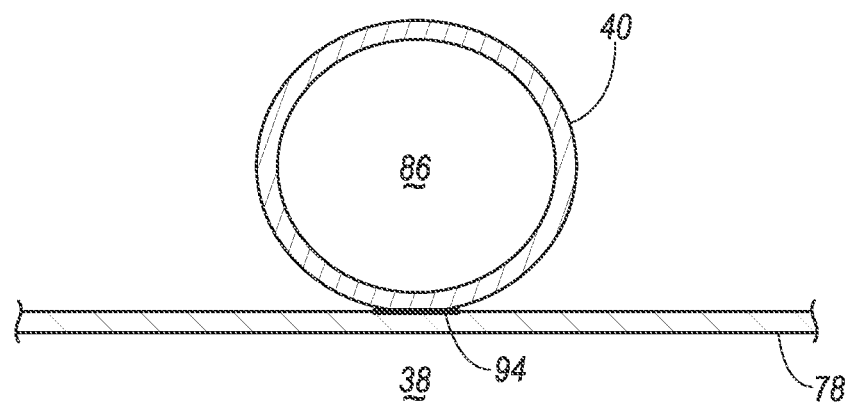
FIG. 10 is a cross-section of a portion of the airbag along line 10 of FIG. 6.

The tube 40 is in fluid communication with the inflation chamber 38. If the tube 40 is unobstructed, then inflation medium may exit the airbag 36 through the vent 80 into the first end 82 of the tube 40 and flow through the tube 40 to the second end 84 and externally to, e.g., the passenger cabin 58. Specifically, as one example, the tube 40 and one of the panels 78 may define a tunnel 86, that is, a gap within the tube 40, and the tunnel 86 may be in fluid communication with the inflation chamber 38, as shown in FIG. 9. Alternatively, as another example, the tube 40 may enclose the tunnel 86 and may be connected to the panel 78, i.e., the panel 78 extending along the inflation chamber 38 between the inflation chamber 38 and the tube 40, as shown in FIG. 10. The tunnel 86 defined between the tube 40 and the panel 78 is shown in the embodiment of FIGS. 3-5B, and the tunnel 86 enclosed by the tube 40 is shown in the embodiment of FIGS. 6-8B merely for example. The tube 40 may be attached to the panel 78 by, e.g., stitching 92, adhesive 94, etc.

The tube 40 may be formed of the same type of material as the airbag 36, as described above. The reaction surface 44, 64, 66 may be rigid relative to the tube 40. In other words, if the tube 40 is pushed against the reaction surface 44, 64, 66, the tube 40 will bend or yield before the reaction surface 44, 64, 66 bends or yields.

With reference to FIGS. 5A-B and 8A-B, the tube 40 extends along the airbag 36 between the airbag 36 in the deployed state and the reaction surface 44, 64, 66. "Between" means "in or through an interval separating." Specifically, a portion 88 of the tube 40 between the first and second ends 82, 84 is disposed between the airbag 36 in the deployed state and the reaction surface 44, 64, 66. Thus, if the airbag 36 in the deployed state is pushed toward the reaction surface 44, 64, 66, then the reaction surface 44, 64, 66 will press against the portion 88 of the tube 40. The vent 80, the first end 82, and the second end 84 may be located anywhere on the airbag, and the tube 40 may follow any shape of path, e.g., straight, curved, etc., so long as the tube 40 extends between the airbag 36 in the deployed state and the reaction surface 44, 64, 66.

Figure 7:
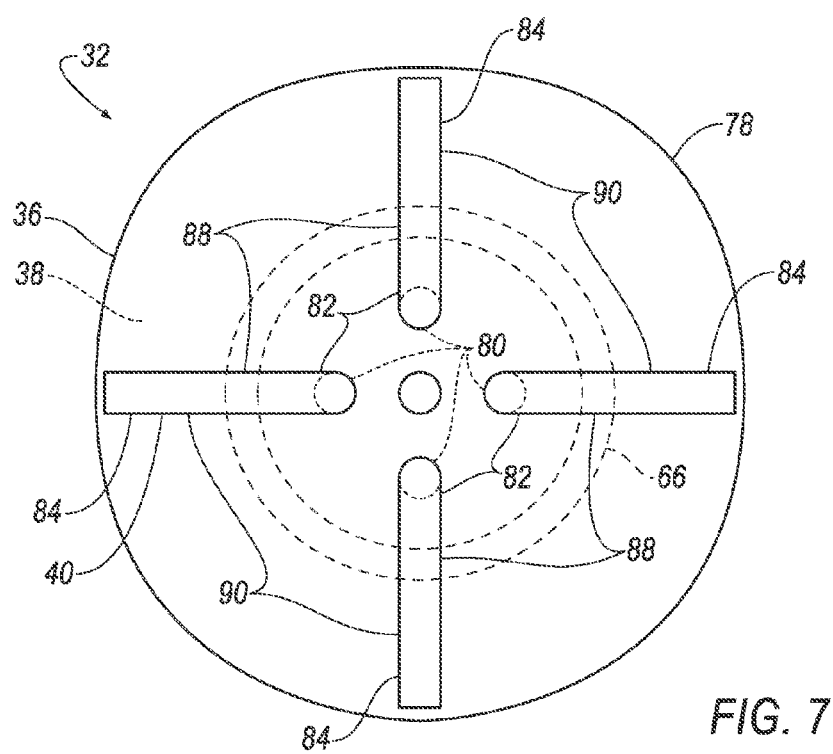
FIG. 7 is a front view of an airbag and a steering wheel of the second embodiment of the restraint system.

With reference to FIG. 6-7, the restraint system 32 may include a second tube 90, or a plurality of tubes 40, 90, extending along the airbag 36 between the airbag 36 in the deployed state and the steering wheel 66. The second tube 90 may be spaced from the tube 40, and the plurality of tubes 40, 90 may be spaced from each other. The plurality of tubes 40, 90 may be disposed transverse or perpendicular to the steering wheel 66 when the airbag 36 is in the deployed state. The tubes may or may not be arranged in a mirror symmetric or rotationally symmetric pattern and may or may not be evenly spaced.

In the event of an impact or impending impact to the vehicle 30, the impact sensor or sensors 70 may collect data and signal the controller 72 through the communications network 76. The controller 72 may detect the impact or impending impact based on the data and instruct the inflator 74 to inflate the airbag 36 through the communications network 76, and the inflator 74 may inflate the airbag 36.

The airbag 36 is designed to compress the tube 40 against the reaction surface 44, 64, 66 when the airbag 36 in the deployed state is directed toward the reaction surface 44, 64, 66 and to space the tube 40 from the reaction surface 44, 64, 66 when the airbag 36 in the deployed state is directed away from the reaction surface 44, 64, 66. If the impact to the vehicle 30 causes an occupant to have momentum in a first direction that, when the occupant moves into the airbag 36, pushes the tube 40 against the reaction surface 44, 64, 66, then less inflation medium will exit the airbag 36 through the tube 40, and the airbag 36 will be stiffer. If the impact to the vehicle 30 causes the occupant to have momentum in a second direction that, when the occupant moves into the airbag 36, pulls the tube 40 away from the reaction surface 44, 64, 66, then more inflation medium will exit the airbag 36 through the tube 40, and the airbag 36 will be softer. If the impact to the vehicle 30 causes the occupant to have momentum in a direction between the first and second directions, then the occupant may push the airbag 36 against the reaction surface 44, 64, 66 more lightly than the first direction, and more inflation medium will exit the airbag 36 through the tube 40 than from the first direction but less inflation medium will exit the airbag 36 through the tube 40 than from the second direction. A stiffer airbag 36 may provide better performance for the occupant in an impact in which the momentum of the occupant is in the vehicle-forward direction because there is a shorter distance between the occupant and a rigid component of the vehicle 30 such as the instrument panel 64 than in an oblique impact. A softer airbag 36 may provide better performance for the occupant in an impact in which the momentum of the occupant is at an angle relative to the vehicle-forward direction because the occupant is less likely to slide off the airbag 36 toward, e.g., the instrument panel 64 than with a stiffer airbag 36.

For example, FIGS. 5A-B show the occupant impacting the airbag 36 when the reaction surface is the A pillar 44. As shown in FIG. 5A, the momentum of the occupant may push the occupant into the airbag 36 and directs the airbag 36 toward the reaction surface 44, 64, 66. The airbag 36 pushes the tube 40 into the A pillar 44, compressing the tube 40 against the reaction surface 44, 64, 66, which completely or partially restricts the flow of inflation medium through the tube 40. Because the airbag 36 loses less inflation medium through the tube 40, the airbag 36 is stiffer. Alternatively, as shown in FIG. 5B, the momentum of the occupant may push the occupant into the airbag 36 and directs the airbag 36 away from the reaction surface 44, 64, 66. The airbag 36 does not push the tube 40 into the A pillar 44, instead spacing the tube 40 from the reaction surface 44, 64, 66. Because the airbag 36 loses more inflation medium through the tube 40, the airbag 36 is softer.

For another example, FIGS. 8A-B show the occupant impacting the airbag 36 when the reaction surface is the steering wheel 66. As shown in FIG. 8A, the momentum of the occupant may push the occupant into the airbag 36 and directs the airbag 36 toward the reaction surface 44, 64, 66. The airbag 36 pushes the tubes 40, 90 into the steering wheel 66, compressing all of the plurality of tubes 40, 90 against the reaction surface 44, 64, 66, which completely or partially restricts the flow of inflation medium through the tubes 40, 90. Because the airbag 36 loses less inflation medium through the tubes 40, 90, the airbag 36 is stiffer. Alternatively, as shown in FIG. 8B, the momentum of the occupant may push the occupant into the airbag 36 and directs the panel 78 of the airbag 36 having the tube 40 away from the reaction surface 44, 64, 66. The airbag 36 does not push at least one tube 40 into the steering wheel 66, instead spacing the tube 40 from the reaction surface 44, 64, 66. Because the airbag 36 loses more inflation medium through the tube 40, the airbag 36 is softer.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system comprising:
   an A pillar of a vehicle;
   an airbag including an inflation chamber and being inflatable from an undeployed state to a deployed state, the airbag being fixed relative to the A pillar in the undeployed state and adjacent the A pillar in the deployed state; and
   a tube in fluid communication with the inflation chamber; wherein the tube extends along the airbag between the airbag in the deployed state and the A pillar.

2. The restraint system of claim 1, wherein the airbag includes a panel, and the tube includes a first end and a second end spaced from each other and fixed to the panel.

3. The restraint system of claim 2, wherein the tube and the panel define a tunnel, the tunnel being in fluid communication with the inflation chamber.

4. The restraint system of claim 2, wherein the tube and the panel are formed of the same type of material.

5. The restraint system of claim 1, wherein the airbag includes a panel extending along the inflation chamber between the inflation chamber and the tube.

6. The restraint system of claim 5, wherein the airbag has a vent disposed at the first end of the tube.

7. The restraint system of claim 6, wherein a portion of the tube between the first and second ends is disposed between the airbag in the deployed state and the A pillar.

8. The restraint system of claim 1, wherein the tube extends from a first end to a second end, the first end being in fluid communication with the inflation chamber and the second end open external to the inflation chamber.

9. The restraint system of claim 1, wherein the A pillar is rigid relative to the tube.

10. The restraint system of claim 1, wherein the airbag is designed to compress the tube against the A pillar when the airbag in the deployed state is directed toward the A pillar.

11. The restraint system of claim 10, wherein the airbag is designed to space the tube from the reaction surface when the airbag in the deployed state is directed away from the A pillar.

12. The restraint system of claim 1, further comprising an instrument panel fixed relative to the A pillar, wherein the airbag in the undeployed state is disposed in the instrument panel.

13. A restraint system comprising:
   a steering wheel;

an airbag including an inflation chamber and being inflatable from an undeployed state to a deployed state, the airbag being fixed relative to the steering wheel in the undeployed state and adjacent steering wheel in the deployed state; and a tube in fluid communication with the inflation chamber;

wherein the tube extends along the airbag between the airbag in the deployed state and the steering wheel.

14. The restraint system of claim 13, wherein the airbag in the undeployed state is disposed in the steering wheel.

15. The restraint system of claim 13, further comprising a second tube extending along the airbag between the airbag in the deployed state and the steering wheel, the second tube spaced from the tube.

16. The restraint system of claim 13, wherein the airbag includes a panel, and the tube includes a first end and a second end spaced from each other and fixed to the panel.

17. The restraint system of claim 16, wherein the tube and the panel define a tunnel, the tunnel being in fluid communication with the inflation chamber.

18. The restraint system of claim 16, wherein the tube and the panel are formed of the same type of material.

19. The restraint system of claim 13, wherein the airbag includes a panel extending along the inflation chamber between the inflation chamber and the tube.

20. The restraint system of claim 13, wherein the tube extends from a first end to a second end, the first end being in fluid communication with the inflation chamber and the second end open external to the inflation chamber.

\* \* \* \* \*